United States Patent Office 2,978,312
Patented Apr. 4, 1961

2,978,312
PROCESSES FOR PRODUCING FERTILIZERS AND PRODUCTS THEREOF

James E. Seymour, Collinsville, Ill., assignor, by mesne assignments, to Central Farmers Fertilizer Company, Chicago, Ill., a corporation of Illinois No Drawing. Filed Mar. 29, 1955, Ser. No. 497,787

4 Claims. (Cl. 71—33)

This invention relates to an improved process for producing phosphatic fertilizers and to certain novel products resulting therefrom.

Commercially practical phosphatic fertilizer production has heretofore been predicated primarily upon the conversion of phosphate rock to superphosphate, and upon the production of mixed fertilizers from superphosphate. While a number of different processes have been proposed, most phosphatic fertilizer now commercially available is manufactured by acidulating phosphate rock.

In my copending applications, Serial Numbers 497,785, now Patent No. 2,837,418, and 497,789, now Patent No. 2,908,561, filed concurrently herewith, I have described the production of superphosphates and mixed fertilizers by using a metaphosphate selected from the group consisting of calcium metaphosphate, potassium metaphosphate and sodium metaphosphate under conditions such that hydrolysis of the metaphosphate to the corresponding primary orthophosphate is effected. In said copending applications, I have described the effect of strong mineral acids in promoting such hydrolysis under conditions suitable for commercial fertilizer production. The present invention is based upon the discovery that the metaphosphates referred to may be hydrolyzed to produce novel and valuable fertilizer products by means of the water soluble strong bases of potassium and sodium, that is, strong bases selected from the group consisting of the hydroxides, carbonates, oxides and peroxides of potassium and sodium. The discovery that hydrolysis of said metaphosphates can be effected by such bases under commercial fertilizer conditions is of particular importance because it encompasses the use of naturally occurring pearl ash and soda ash, as the hydrolyzing agent.

In the presence of effective amounts of the strong bases referred to, the metaphosphate is hydrolyzed to the corresponding primary orthophosphate in accordance with the following typical equation:

(1)    $Ca(PO_3)_2 + 3H_2O \rightarrow CaH_4(PO_4)_2 \cdot H_2O$

The strong base, not having entered reactively into the hydrolysis, is still available for reaction with the primary orthophosphate:

(2)    $CaH_4(PO_4)_2 \cdot H_2O + KOH \rightarrow CaHPO_4 \cdot 2H_2O + KH_2PO_4$ (3)    $CaH_4(PO_4)_2 \cdot H_2O + 2KOH \rightarrow CaHPO_4 \cdot 2H_2O + K_2HPO_4 + H_2O$ (4)    $CaH_4(PO_4)_2 \cdot H_2O + 3KOH \rightarrow CaHPO_4 \cdot 2H_2O + K_3PO_4 + 2H_2O$ (5)    $CaH_4(PO_4)_2 \cdot H_2O + K_2CO_3 \rightarrow CaCO_3 + 2KH_2PO_4 + H_2O$ (6)    $CaH_4(PO_4)_2 \cdot H_2O + 2K_2CO_3 \rightarrow CaCO_3 + 2K_2HPO_4 + CO_2 + 2H_2O$ The above equations are illustrative for the three metaphosphates and the strong bases specified. It will be noted that, in each case, the product includes not only the phosphatic salt but also a "liming agent," e.g., dicalcium phosphate, calcium carbonate, calcium hydroxide, etc. The liming agent makes the product especially advantageous for acid and neutral soils. Further, such products are highly useful for legumes and like crops.

The proportion of strong base employed does not materially exceed the stoichiometric quantity required for complete reaction with the primary orthophosphate resulting from hydrolysis of the metaphosphate, otherwise an excess of the strong base would be present in the finished product. Depending upon the nature of the product desired, only a relatively small proportion of the strong base may be used, in which case there will be correspondingly less decomposition of the primary orthophosphate. Thus, the composition of the end product can be varied within wide limits. However, sufficient strong base must be employed to effect hydrolysis at a rate high enough for practical fertilizer process conditions. Therefore, it is necessary to employ at least one part by weight of the strong base for each ten parts by weight of the metaphosphate.

Full reaction times are as short as a few seconds, when the higher proportion of the strong base are employed. The speed of the reaction can be readily controlled, not only by varying the proportions of the reactants, but also by adding the base in the form of an aqueous solution and selecting the desired concentration of the base in the solution. The reaction proceeds more rapidly with the hydroxides than with the carbonates. When the proportions recited herein are employed, the reaction can always be carried to completion sufficient for drying of the product within about 15 minutes.

Ordinarily, sufficient water for complete hydrolysis should be employed when lower proportions of the strong base are employed, though the amount of water employed can be somewhat reduced, since water once consumed in hydrolysis of the metaphosphate is reconstituted in disassociation of the primary orthophosphate. While it is desirable to keep the water content near the stoichiometric proportion required for hydrolysis when lower proportions of the strong base are employed, the water may be increased to several times the stoichiometric quantity required for hydrolysis when higher proportions of the base are employed. When higher proportions of the strong base are employed, the reaction mixture is converted to a dry solid in times as short as a few seconds. When it is desirable to use small proportions of the base, the reaction mixture still converts rapidly to a pasty mass which is easily handled in conventional drying equipment.

The ingredients may be combined in a conventional pan mixer, mixed until fully granulated, and delivered by conveyor to pile for curing, no special equipment being required. When drying is required, the reaction mixture is simply delivered to a rotary direct fired drier, thence to pile. The process is particularly convenient because the dry materials, in granular form, may simply be blended in the mixer for uniformity and the water then added as mixing continues. Similarly, if the base is added as aqueous solution, such aqueous solution may contain all of the water employed.

Initial temperature of the reactants is not critical. The reaction mixture temperature increases rapidly during mixing, with temperatures above 300° F. frequently obtained when molar proportions of the strong base are employed.

The following examples are illustrative:

Example 1

|  | Parts by weight |
|---|---|
| Calcium metaphosphate | 46.49 |
| Potassium hydroxide (85%) | 31.38 |
| Water | 22.23 |

The water and potassium hydroxide were added as aqueous solution to the metaphosphate in a bowl mixer and mixed for 45 seconds, at the end of which time the reaction temperature was 242° F. and the product a damp crumbly solid. Two days after manufacture, the product was hard and dry and analyzed:

| | |
|---|---|
| Moisture | 2.85 |
| Total $P_2O_5$ | 40.15 |
| Insoluble $P_2O_5$ | 3.15 |
| Available $P_2O_5$ | 37.00 |
| Potash as $K_2O$ | 29.90 |
| Basicity to methyl orange as NaOH | 6.80 |

*Example 2*

| | Parts by weight |
|---|---|
| Calcium metaphosphate | 60.62 |
| Potassium hydroxide (85%) | 17.17 |
| Water | 22.21 |

A solution of the potassium hydroxide in the water was prepared and then added at 150° F. to the metaphosphate in a bowl mixer. The mixture was mixed for one minute and 15 seconds, at the end of which period the reaction temperature was 220° F. and the product a dry, crumbly solid. One day after manufacture, the product analyzed:

| | |
|---|---|
| Moisture | 11.71 |
| Total $P_2O_5$ | 44.50 |
| Insoluble $P_2O_5$ | 1.65 |
| Available $P_2O_5$ | 42.85 |
| Potash as $K_2O$ | 14.18 |
| Basicity to methyl orange as NaOH | 2.70 |

*Example 3*

| | Parts by weight |
|---|---|
| Calcium metaphosphate | 38.29 |
| Potassium hydroxide (85%) | 32.54 |
| Water | 29.17 |

The potassium hydroxide was dissolved in the water and this solution added, at 135° F., to the metaphosphate in a bowl mixer. Mixing was carried out for one minute and 45 seconds, after which the reaction temperature was 235° F. and the product was a wet solid. One day after manufacture, the product analyzed:

| | |
|---|---|
| Moisture | 7.78 |
| Total $P_2O_5$ | 35.15 |
| Insoluble $P_2O_5$ | .30 |
| Available $P_2O_5$ | 34.85 |
| Potash as $K_2O$ | 22.33 |
| Basicity to methyl orange as NaOH | 8.30 |

*Example 4*

| | Parts by weight |
|---|---|
| Potassium metaphosphate | 55.04 |
| Potassium hydroxide (85%) | 26.15 |
| Water | 18.81 |

The potassium hydroxide was dissolved in the water and this solution, at 165° F., added to the metaphosphate in a bowl mixer. Mixing was carried out for 5 minutes, at the end of which period the product was a wet solid. Maximum reaction temperature was 160° F. The product was oven dried for one hour at 105° C. Twenty-four days after manufacture, the product analyzed.

| | |
|---|---|
| Moisture | 1.57 |
| Total $P_2O_5$ | 41.50 |
| Insoluble $P_2O_5$ | None |
| Available $P_2O_5$ | 41.50 |
| Potash as $K_2O$ | 51.20 |
| Basicity to methyl orange as NaOH | 10.10 |

*Example 5*

| | Parts by weight |
|---|---|
| Potassium metaphosphate | 37.97 |
| Potassium hydroxide | 36.08 |
| Water | 25.95 |

The potassium hydroxide was dissolved in the water and this solution, at 185° F., added to the metaphosphate in a bowl mixer. Mixing was carried out for 4 minutes, at the end of which time the product was a very thick slurry. Maximum reaction temperature was 175° F. The product was oven dried at 105° C. for one hour. Twenty-four days after manufacture, the product analyzed:

| | |
|---|---|
| Moisture | .11 |
| Total $P_2O_5$ | 31.95 |
| Insoluble $P_2O_5$ | .02 |
| Available $P_2O_5$ | 31.93 |
| Potash as $K_2O$ | 57.32 |
| Basicity to methyl orange as NaOH | 15.30 |

*Example 6*

| | Parts by weight |
|---|---|
| Potassium metaphosphate | 37.97 |
| Potassium hydroxide (85%) | 36.08 |
| Water | 25.95 |

The potassium hydroxide was dissolved in the water and this solution added at 185° F., to the metaphosphate in a bowl mixer. Mixing was carried out for 4 minutes, at the end of which time the product was a very thick slurry. Maximum reaction temperature was 175° F. The product was oven dried for 30 minutes at 105° C. After 24 days, the product analyzed:

| | |
|---|---|
| Moisture | 3.58 |
| Total $P_2O_5$ | 32.55 |
| Insoluble $P_2O_5$ | None |
| Available $P_2O_5$ | 32.55 |
| Potash as $K_2O$ | 38.95 |
| Basicity to methyl orange as NaOH | 18.60 |

*Example 7*

A 0-37-37 product is formulated as follows:

| | Parts by weight |
|---|---|
| Calcium metaphosphate | 25.0 |
| Potassium metaphosphate | 75.0 |
| Pearl ash (68% $K_2O$) | 45.6 |
| Water | 25.0 |

The pearl ash and the metaphosphates are blended in a pan mixer and the water added during mixing. Mixing is continued for 3 minutes, at the end of which time the product is a damp solid at 120° F. The product is delivered directly from the mixer to a rotary horizontal drying drum and there dried for 5 minutes with the drying medium at about 250° F. The product granulates in the drier and is delivered to pile for final cure.

Cured products produced in accordance with the invention are hard and dry with each particle being homogeneous as to available $P_2O_5$ and $K_2O$.

I claim:
1. A process for producing fertilizers comprising combining at least one metaphosphate selected from the group consisting of calcium metaphosphate, potassium metaphosphate, and sodium metaphosphate, a hydrolyzing agent selected from the group consisting of the strong bases of sodium and potassium, and water, the hydrolyzing agent being included in an effective proportion not materially exceeding the stoichiometric quantity required to react with the hydrolysis product of such metaphosphate, and the water being present in proportion sufficient for substantial hydrolysis of such metaphosphate and not exceeding several times the stoichiometric quantity required for such hydrolysis, intimately mixing the resulting reaction mixture to cause hydrolysis of the metaphosphate, and curing the resulting product.

2. The process of claim 1 wherein said hydrolyzing agent is first dissolved in the water and the resulting solution then added to the metaphosphate with continuous mixing.

3. A process for producing particulate fertilizers each particle of which is homogeneous as to available $P_2O_5$ and $K_2O$ comprising combining at least one metaphosphate selected from the group consisting of calcium metaphosphate, potassium metaphosphate and sodium metaphosphate with water and, as a hydrolyzing agent, pearl ash in particulate form, the water being present in proportion sufficient for substantial hydrolysis of the metaphosphate and not exceeding several times the stoichiometric quantity required for such hydrolysis, and the pearl ash being included in effective proportion not exceeding the stoichiometric quantity required to react with the hydrolysis product of such metaphosphate, intimately mixing the resulting reaction mixture to cause hydrolysis of the metaphosphate, and curing the resulting product.

4. A process for producing particulate fertilizers rich in available $P_2O_5$ and $K_2O$ and containing a liming agent comprising combining calcium metaphosphate and at least an equal amount of potassium metaphosphate with water and, as a hydrolyzing agent, pearl ash in particulate form, the water being present in proportion sufficient for substantial hydrolysis of the metaphosphates and the pearl ash being included in effective proportion not exceeding the stoichiometric quantity required to react with the products of hydrolysis of such metaphosphates, intimately mixing the resulting reaction mixture to cause hydrolysis of the metaphosphate, and curing the resulting product.

References Cited in the file of this patent

UNITED STATES PATENTS

| | | |
|---|---|---|
| 2,019,665 | Fiske et al. | Nov. 5, 1935 |
| 2,130,557 | Munter | Sept. 20, 1938 |
| 2,165,948 | Taylor | July 11, 1939 |
| 2,837,418 | Seymour | June 3, 1958 |

OTHER REFERENCES

Industrial and Engineering Chem., The Useful Life of Pyro, Meta and Tetraphosphates, Morgan et al., vol. 35, No. 7, July 1943, pages 821–824.